United States Patent [19]

Burns et al.

[11] 4,360,954
[45] Nov. 30, 1982

[54] METHOD OF MAKING CAST-IN-PLACE SABOTS

[75] Inventors: Bruce P. Burns, Churchville; Richard D. Kirkendall, Havre de Grace, both of Md.

[73] Assignee: The United States of America as represented by the Secretary of the Army, Washington, D.C.

[21] Appl. No.: 235,060

[22] Filed: Feb. 17, 1981

[51] Int. Cl.³ .................... B21K 21/06; B22D 19/00
[52] U.S. Cl. .................... 29/1.23; 164/108; 102/521
[58] Field of Search ............ 29/1.20, 1.22, 1.23; 102/521, 522, 523, 529; 164/108, 110

[56] References Cited

U.S. PATENT DOCUMENTS

| 16,117 | 7/1925 | Conradson | 164/108 |
| 2,983,224 | 5/1961 | Prosen et al. | 29/1.23 |
| 3,100,448 | 8/1963 | Hablutzel | 102/523 |
| 3,262,391 | 7/1966 | Shober | 102/521 |
| 3,905,299 | 9/1975 | Feldmann | 102/522 |
| 4,029,018 | 6/1977 | Bjornson | 102/521 |
| 4,215,632 | 8/1980 | Zaandam | 102/521 |

Primary Examiner—R. L. Spruill
Assistant Examiner—Paul M. Heyrana, Sr.
Attorney, Agent, or Firm—Nathan Edelberg; Robert P. Gibson; M. Yarmovsky

[57] ABSTRACT

The invention deals with the manufacture of fully segmented sabots used in the launching of subcaliber projectiles. The prior method required the machining of individual sabot segments and fitting them on to the sub-projectile. The improvement involves the casting of the sabot segments with the shimmed sub-projectile pre-positioned in a mold.

11 Claims, 6 Drawing Figures

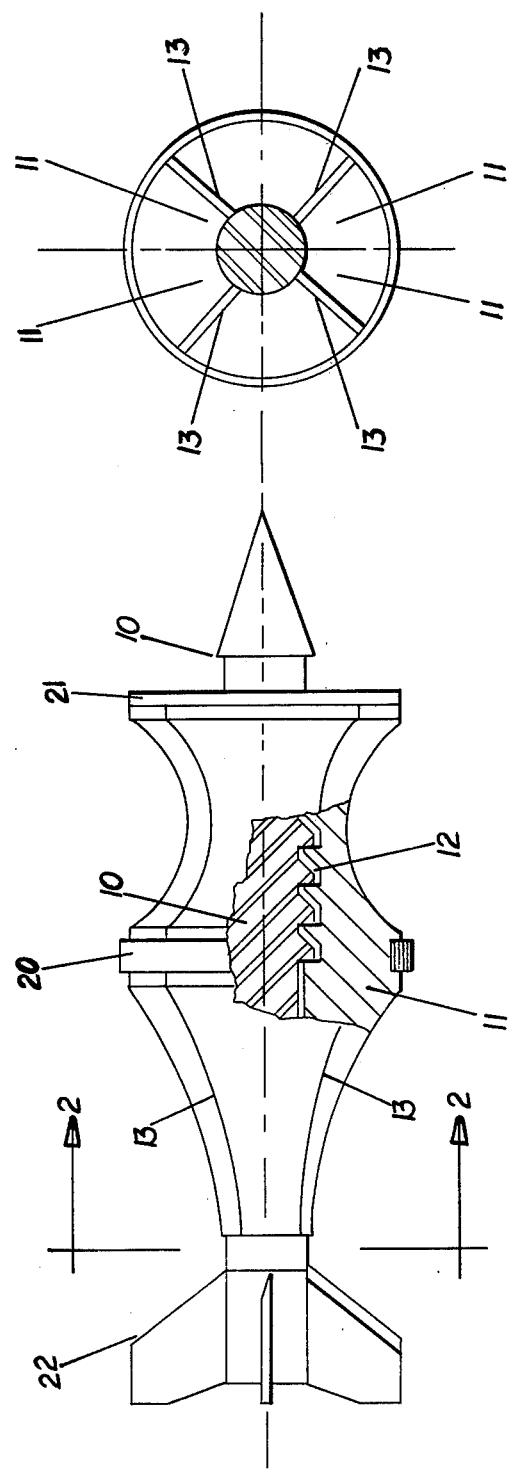

METHOD OF MAKING CAST-IN-PLACE SABOTS

GOVERNMENTAL INTEREST

The invention described herein may be manufactured, used and licensed by or for the Government for governmental purposes without the payment to us of any royalty thereon.

BACKGROUND OF THE INVENTION

The prior art method of manufacturing saboted projectiles was to first make the sabot segments and then assemble them on the sub-projectile. The sabot segments always required expensive and relatively precise machining; this precision being essential since force transmitting matching surfaces are involved. The intricate geometric designs preclude reasonable quality control of the critical matching surfaces. The prior art method also made mass production difficult, tolerance controls created problems in matching and fitting of segments and hence adversely influenced performance. This invention eliminates the disadvantages discussed above.

SUMMARY OF THE INVENTION

The present invention eliminates the need for precision machining of sabot segments prior to assembly on the subprojectile. By utilization of an appropriately designed mold with two or more shims located in the cavity between the subprojectile and the mold, the sabot segments are cast in place around the sub-projectile. In this manner proper fit and dimensional control are insured. The cast material may be a metal such as an aluminum or a magnesium alloy. Alternatively, reinforced or unreinforced plastics may be used.

BRIEF DESCRIPTION OF DRAWINGS

FIG. 1 is a side view with a partial section of a saboted sub-projectile or penetrator.

FIG. 2 is cross-sectional view taken along line 2—2 of FIG. 1.

DESCRIPTION OF THE PREFERRED EMBODIMENTS

Figure 3:
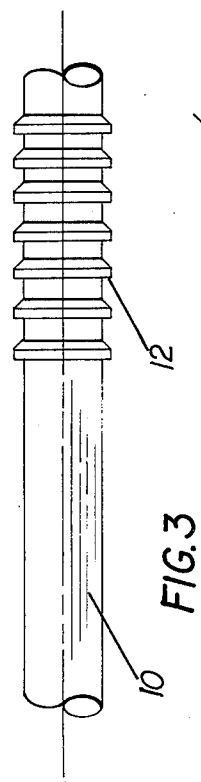
FIG. 3 is a side view of a portion of the sub-projectile.

As shown in FIG. 1, a sub-projectile including a penetrator with fins and windshield has been saboted and is ready for loading or packing. Sub-projectile 10 is encased with four sabot segments 11, also shown in FIG. 2. As further detailed in FIG. 3, the sub-projectile 10 has grooves 12 which may be produced by rolling, machining or grinding with the material typically being a tungsten-steel alloy or a depleted uranium alloy. Alternatively, the sub-projectile 10 may be composed of other alloys or composite type materials.

In the cast-in-place method of the present invention, sabot segments 11 are achieved by the introduction of shims 13 during the casting process and effective use of mold release agents such as graphite or whiting for metal castings, and zinc stearate powder, mineral oil or teflon for plastics on at least one side of each shim 13. The shims 13 may be stamped from an appropriate thin sheet of metal. The metal may be made of a material such as steel and of a thickness such that it resists distortion when subjected to the temperatures of the molten sabot metal aforementioned. The inner edge of the shims need only approximate the profile of the sub-projectile to be effective thereby minimizing their production cost.

Figure 4:
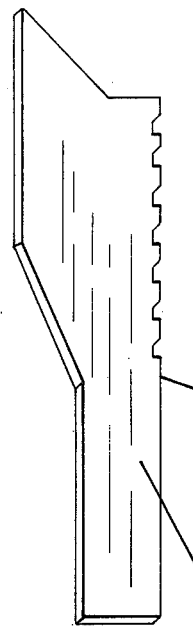
FIG. 4 is a side view of a shim.
Figure 6:
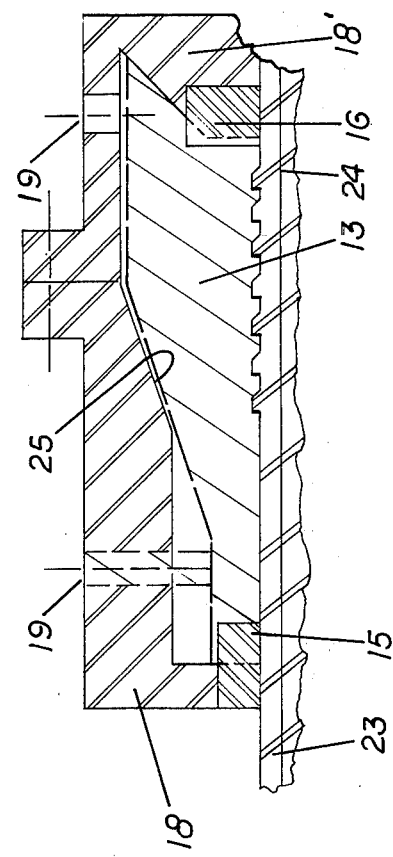
FIG. 6 is a schematic cross-sectional view of the assembly shown in FIG. 5 in a casting mold.
Figure 5:
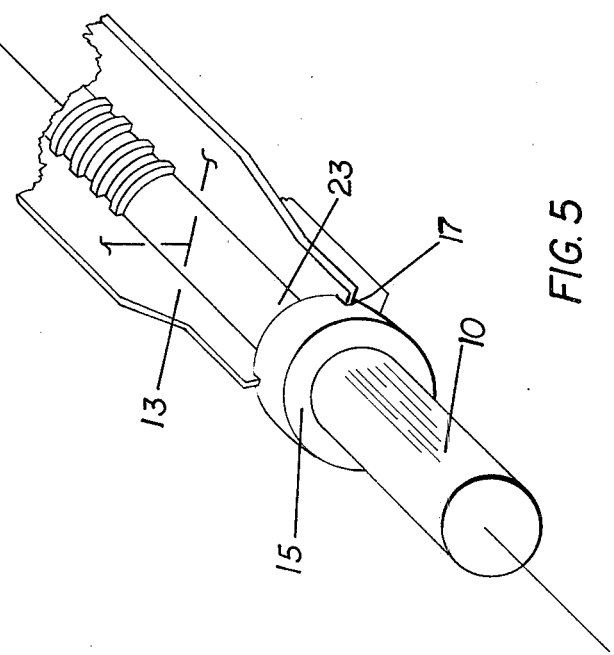
FIG. 5 is an isometric view of a portion of the assembly of shims and spacing jig on the sub-projectile.

As shown in FIGS. 5 and 6, the shims 13 are held in place by a jig 15 at the rearward end 23 of the sub-projectile 10 and a jig 16 at the forward end 24 of projectile 10. Simple means such as slots 17 can be used to properly space the shims 13. Jigs 15 and 16 may be composed of such material as cast iron or steel in order to sustain repeated usage. Those surfaces coming in contact with the molten sabot metal would also be coated with a release agent such as aforementioned. The jigged assembly of FIG. 5 is then placed in a split outer mold 18 and 18' constructed of a cast iron or steel. The use of sand molds or die casting methods well known in the art may also be used. As with the aforementioned components, a mold release agent may be used on the inner surfaces 25 of the permanent metallic molds 18 and 18'. Conventional mold openings 19 are also shown in FIG. 6 for pouring and bleeding of air during the casting process. The mold design shown in FIG. 6 is one of a number of possibilities, all well known by those skilled in the art.

The sabot castings may be made with alloys of aluminum or magnesium. However, use of non-metallics, such as liquid plastic, including reinforced composites such as liquid reinforced plastic may be used with the afore-described process. In addition, pressure molding or injection molding may have application here.

In operation, after the split molds 18 and 18' are operatively closed and upon completion of the pouring of the molten sabot material into the mold openings 19, the assembly is allowed to cool. The mold is then stripped from the saboted sub-projectile 10. The jigs 15 and 16 are then removed from the rough cast sabot 11 and sub-projectile 10 which is then made ready for final finishing. The rough cast sabot 11 and sub-projectile 10 are then placed in a conventional lathe or automated lathe and the external surface of the sabot segments and shims machined to the final design configuration. Conventional type clamp means may be temporarily used to prevent the sabot segments from coming apart during machining. With accurate casting, the machining step quite possibly may not be necessary. At this stage, other components such as bands 20 and 21 and fins 22 may be added.

The method described above has the potential of significant cost reduction and more uniform behavior of the mass produced item, although some potential performance penalties from casting are anticipated. The latter aspect is due to the inherent differences between peak strength and toughness of cast materials vs. the similar properties for extruded or forged materials. The different properties can, of course, be accommodated in a rational, optimal design methodology; the final design of a structure fabricated from the cast material will, in general, be different from its extruded counterpart. The situation is such, however, that only mass producible items may be acceptable for reasons of economy: in this case any necessary additional parasitic mass must be tolerated to achieve the substantial economic benefits accrued from cast sabots.

We claim:

1. A method of making cast-in-place sabot for a sub-projectile which comprises the steps of:
   (a) preparing a plurality of shims with a profile on one edge matching that of the profile of the sub-projectile and a profile at the other edge matching that of the inner contour of a casting split mold;
   (b) coating the split mold with a release agent;
   (c) assembling the shims on the sub-projectile with means designed to fix them to the sub-projectile;
   (d) coating the fixing means with a release agent;
   (e) applying a release agent to all shim and sub-projectile surfaces to come in contact with a subsequently cast material;
   (f) placing the sub-projectile and shim assembly in the mold;
   (g) fastening the mold sections together;
   (h) casting the mold with a liquid that will subsequently harden, creating the sabot segments; and
   (i) stripping the mold and the shim fixing means from the sub-projectile.

2. The method as recited in claim 1 wherein the step of preparing the shims include the step of stamping the shims from sheet metal which resists distortion and melting when subjected to the liquid during casting.

3. The method as recited in claim 1 further comprising fixing four shims to the sub-projectile.

4. The method as recited in claim 1 which comprises positioning a first jig at the rear end of the sub-projectile to hold one end of the shims, positioning a second jig on the front end of the sub-projectile to hold the other end of the shims so that the shims are fixed to the sub-projectile.

5. The method as recited in claim 1 further comprising casting a molten metal into the mold wherein the molten metal is an aluminum alloy and allowing it to cool prior to stripping.

6. The method as recited in claim 1 further comprising casting a molten metal into the mold wherein the molten metal is a magnesium alloy and allowing it to cool prior to stripping.

7. The method as recited in claim 1 further comprising casting a liquid plastic into the mold and allowing it to set prior to stripping.

8. The method as recited in claim 7 further comprising casting a liquid reinforced plastic into the mold and allowing it to set prior to stripping.

9. The method as recited in claim 1, the additional step comprising clamping the sabot segments and shims together and machining the external surfaces of the sabot segments and shims to the desired profile.

10. The method as recited in claim 1 or 9 further comprising applying a band member to the outside surface of the sabot segments.

11. The method as recited in claim 1 or 9 further comprising applying a fin member to the rear end of the sub-projectile.

* * * * *